(12) United States Patent
Rao et al.

(10) Patent No.: US 11,085,694 B2
(45) Date of Patent: Aug. 10, 2021

(54) MULTIPLE MICROWAVE/RADIOFREQUENCY (MW/RF) MAGNETRONS HEATED SINGLE VESSEL/REACTOR/CHAMBER AND ITS VARIOUS APPLICATIONS INCLUDING A NOVEL DEHYDRATION PROCESS EMPLOYING SOLVENT EXTRACTION AND SOLVENT RECOVERY

(71) Applicant: PELICAN BIOTECH & CHEMICAL LABS PVT LTD, Kerala (IN)

(72) Inventors: Priya Raghavendra Rao, Kerala (IN); Manoj Chuzhattil Narayanan, Kerala (IN); Thomas Jacob, Kerala (IN)

(73) Assignee: PELICAN BIOTECH & CHEMICAL LABS PVT LTD, Kerala (IN)

( * ) Notice: Subject to any disclaimer, the term of this patent is extended or adjusted under 35 U.S.C. 154(b) by 934 days.

(21) Appl. No.: 15/314,485

(22) PCT Filed: May 20, 2015

(86) PCT No.: PCT/IN2015/000215
§ 371 (c)(1),
(2) Date: Nov. 28, 2016

(87) PCT Pub. No.: WO2015/181832
PCT Pub. Date: Dec. 3, 2015

(65) Prior Publication Data
US 2017/0191755 A1    Jul. 6, 2017

(30) Foreign Application Priority Data

May 30, 2014    (IN) .......................... 2659/CHE/2014

(51) Int. Cl.
*F26B 3/347*    (2006.01)
*B01J 19/12*    (2006.01)
(Continued)

(52) U.S. Cl.
CPC ............. *F26B 3/347* (2013.01); *B01J 19/126* (2013.01); *B01J 19/129* (2013.01); *H05B 6/78* (2013.01); *H01J 25/50* (2013.01)

(58) Field of Classification Search
None
See application file for complete search history.

(56) References Cited

U.S. PATENT DOCUMENTS 4,629,849 A * 12/1986 Mizutani .................. H05B 6/74
                                                        219/749
5,438,183 A *  8/1995 Hayami .................... H05B 6/72
                                                        219/748

(Continued)

FOREIGN PATENT DOCUMENTS

CN            203405069 U  *  1/2014

*Primary Examiner* — Jason Lau
(74) *Attorney, Agent, or Firm* — Nath, Goldberg & Meyer; Joshua B. Goldberg

(57) ABSTRACT

This invention describes large microwave/radiofrequency (RF/MW) heating equipments scalable to any size heated with RF/MW heating systems employing multiple magnetrons independent of its wave characteristics arranged in a particular fashion to avoid wave interferences and concentrated heating without turn tables. The invention also explains the various embodiments of the invention like solvent dehydration and solvent recovery using the above mentioned invention.

3 Claims, 2 Drawing Sheets

(51) Int. Cl.
*H05B 6/78* (2006.01)
*H01J 25/50* (2006.01)

(56) References Cited

U.S. PATENT DOCUMENTS 6,361,707 B1 3/2002 Tanaka et al.
2014/0130367 A1* 5/2014 Yonekawa ........ H01L 21/02052
34/380

* cited by examiner

FIG. 1 MAGNETRONS SPIRALLY PLACED IN THE SIDE OF THE VESSELS
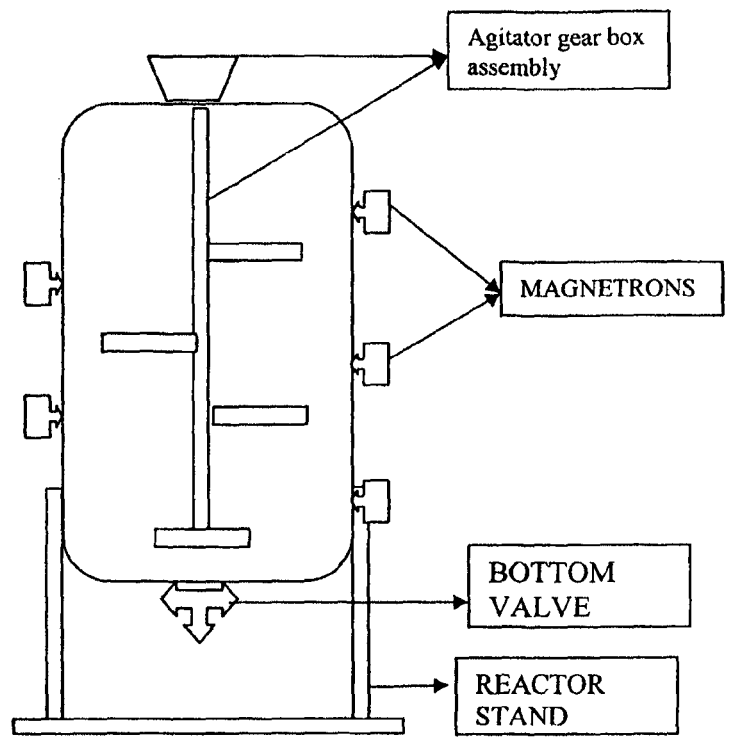
FIG. 2 MAGNETRONS SPIRALLY PLACED ON THE AGITATOR
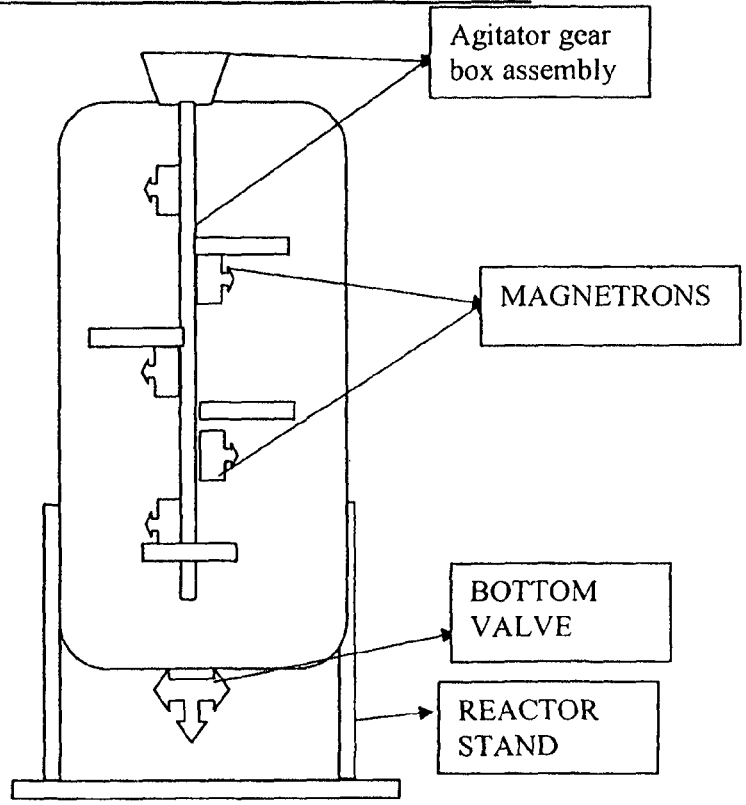

FIG. 3: DESIGN OF BOOTH THAT WILL SCATTER THE RF/MW RADIATION:
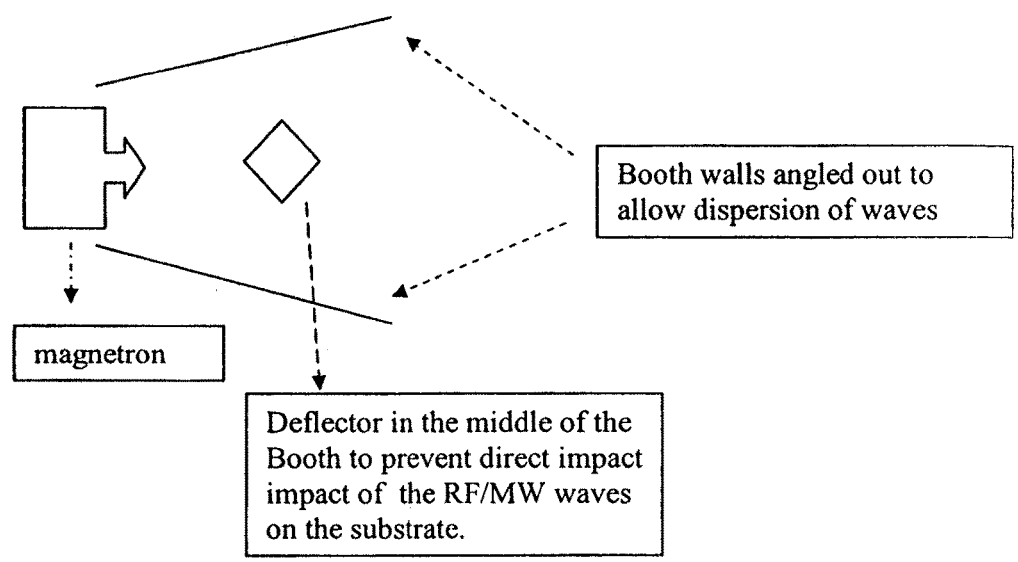

ND SINGLE
MULTIPLE MICROWAVE/RADIOFREQUENCY (MW/RF) MAGNETRONS HEATED SINGLE VESSEL/REACTOR/CHAMBER AND ITS VARIOUS APPLICATIONS INCLUDING A NOVEL DEHYDRATION PROCESS EMPLOYING SOLVENT EXTRACTION AND SOLVENT RECOVERY

CROSS-REFERENCE TO RELATED APPLICATIONS

This application is the U.S. national phase application, pursuant to 35 U.S.C. § 371, of PCT international application Ser. No.: PCT/IN2015/000215, filed May 20, 2015, designating the United States and published in English, which claims priority to and the benefit of Indian Patent Application No. 2659/CHE/2014, filed May 30, 2014, the entire contents of which are incorporated herein by reference in their entirety.

FIELD OF INVENTION

An object of this invention is to propose a new design of RF/MW heating system employing multiple magnetrons inside a single large vessel/reactor/chamber henceforth termed as RF/MW reactor. The current art of using single magnetron is not scalable while the current art of using multiple magnetrons requires phase correction at $\frac{1}{4}^{th}$ $\lambda$ for avoiding interference of the waves generated out of the multiple magnetrons. In the present invention multiple magnetrons that are independent of their wave characteristics are arranged vertically and horizontally in a spiral fashion radiating into RF/MW reactor such that their waves don't cross each other and such a way that the magnetrons don't create interference of waves. The present invention also provides for avoiding concentrated heating of the substrate in the vicinity of the magnetrons. The present invention also describes various applications of the MW/RF reactor including a novel method of dehydration of substrates by solvent extraction and subsequent solvent removal from the substrate by radiofrequency/microwave (RF/MW) heating system.

BACKGROUND OF THE INVENTION

The application is a continuation-in-part of claims subject matter disclosed in earlier filed application (no. 1576/CHE/2010) filed on 8 Jun. 2010, published on Indian patent 13 Jul. 2012 by inventors of the present invention. The current art of solvent extraction of water and subsequent removal of solvent from the substrate by RF/MW disclosed in the earlier application mentioned above pertains only to the volume of the substrate that can be handled by a single magnetron as disclosed in our earlier application (No. 1576/CHE/2010). The other current arts of RF/MW equipments provides for single magnetron of high capacity or multiple magnetrons. However the single magnetron used for removing the residual solvent in the MW/RF dehydration system as mentioned above only provides for a dehydrating system in small volumes and has limited scalability whereas dehydration systems require huge capacities that can scale to tons of substrate. The single magnetron when scaled up into the same capacity is not viable due to the following reasons
1. The high capacity magnetrons require massive transformers, are very bulky and quite expensive.
2. The high capacity magnetron will give out RF/MW radiations that will focus in a small area inside the container. This results in heat built up and consequently chars the substrate.

Meanwhile multiple magnetrons based reactors in the current art need to be spaced at a distance of $\frac{1}{4}^{th}$ $\lambda$ in the single plane. This will again limit the number of magnetrons to four beyond which the waves may overlap and interfere. This limitation will thus prevent scale up of the RF/MW system beyond a few Kilo watts.

The present arts of dehydration, sun drying, oven drying and similar processes of dehydration are time consuming, energy-intensive, cooks/denatures the substrate in the process. The present art of MW and RF drying cannot cater to substrates containing water content or with Loss on Drying (LOD) more than 30% as it will result in cooking of the substrate. The present art of solvent—RF/MW—enabled—dehydration system disclosed in our earlier application is possible only in small volumes and can use only single magnetron as the heating system limiting scalability.

The present art of solvent recovery from substrates after solvent extraction (as in herbal extraction) is to pass steam or hot air. This reduces the recovery of solvent (due to loss in condensation/separation) as well as wets the substrate. The current art of using RF/MW heating system for recovery of solvent is useful only in small volumes and can use only single magnetron as the heating system limiting scalability.

The present invention provides a solution for the above limitations by engaging multiple magnetrons of lower capacity and disperses the radiation emitted to a larger surface area. However multiple magnetrons when used in the same chamber can result in interference that can either add up or neutralize the waves. Both are not desirable in a controlled heating system. The central turn table in the conventional heating system is not viable in the industrial scale where massive quantities of substrates are used in process. The above challenges are solved in the present invention by mounting the magnetrons in various patterns to prevent interference of the waves as well as to avoid use of turn table. The present invention provides for a dehydrating method that can be scaled to any higher capacity.

OBJECT OF THE PRESENT INVENTION

An object of this invention is to provide a new design for RF/MW heating system involving multiple magnetrons in a RF/MW reactor scalable to any large size as required.

Another object of this invention is to use multiple magnetrons in the RF/MW reactor independent of its properties in a manner that their radiations don't get interfered and there is no concentrated heating in the substrate.

Another object of this invention is to provide a new and improvised method for dehydration using solvent extraction—RF/MW heating system.

Another object of this invention is to provide a new method for recovery of the solvent out of substrates after solvent extraction using RF and MW heating systems.

Another object of this invention is to provide a new method to remove any residual solvent from the extracts and similar substances using RF and MW heating systems.

Another object of this invention is to preserve plant and animal materials like vegetables, fish, fruits etc by solvent dehydration followed by recovery and residual solvent removal by RF and MW heating.

BRIEF DESCRIPTION OF THE DRAWINGS

FIG. 1 diagrammatically illustrates a microwave (MW) radiofrequency (RF) heating system;

FIG. 2 diagrammatically illustrates an alternative embodiment of the MW RF heating system; and FIG. 3 diagrammatically illustrates an arrangement for a booth for magnetrons of the MW RF heating system of FIG. 1 or FIG. 2.

DESCRIPTION OF THE INVENTION

According to this invention there is provided a RF/MW heating system that employs multiple magnetrons in a RF/MW reactor. This enables use of low capacity (1-5 KW) magnetrons which are cheaper as well as prevents concentrated heat in a point. In accordance with one embodiment of the present invention, the multiple magnetrons are attached to the wall of the single vessel/reactor/chamber in a spiral fashion (as shown in FIG. 1) such a way that their radiations don't cross ways unless otherwise reflected from the walls of the container. The possibility of the same occurring with the microwave absorbing substrate is a minimum. In a second embodiment of the invention the magnetrons are attached in a spiral fashion to the central agitator (as shown in FIG. 2) of the RF/MW reactor such that their radiations are scattered when the agitator moves around. In a third embodiment of the invention, the booths of the magnetrons are designed such a way that the waves are reflected inside the magnetron booth by placing a multi-faceted reflector such that the waves move away from each other thereby preventing focused heating of the substrate as shown in FIG. 3). The above design features are illustrated in the diagrams attached.

In another embodiment of the present invention, it is disclosed a new process of dehydration of any substrate containing water by soaking the substrate in any volatile solvent like petroleum ether, chloroform, ethyl acetate, acetone, alcohol in RF/MW reactor and then removing the residual solvent in the substrate using RF/MW heating systems. The process involves soaking different wet substrates in appropriate organic solvents. The organic solvents extract water out of the substrate which is then drained out of the RF/MW reactor. The substrate now mostly devoid of water will have residual solvent. This solvent can be removed by applying RF/MW heating system. The RF/MW system heats up the substrate using the residual moisture or other molecules in the substrate which possess dielectric constant/dipole moment. If the substrate does not have residual moisture or molecules with dipole moment, then measured quantities of water is added to the substrate to provide 1-5% moisture such that the substrate is heated up due to the vibration of the water molecules added. If RF/MW heating system were directly used on substrate containing water before solvent dehydration, the heat would have cooked the substrate.

In yet another embodiment of the present invention, it is disclosed a process to operate the vessel with multiple magnetrons where a minimum vacuum of around 375 mm Hg in the MW/RF heated vessel is maintained that sucks out residual air (oxygen) and saturate the container with the solvent vapor. This is to avoid any fire that can generate out of the sparks generated by interference of waves from multiple magnetrons and the metallic contours of the vessel especially when inflammable solvents are used. The use of vacuum is thus a standard feature for the RF/MW reactor and is employed whenever an inflammable solvent is used in the RF/MW reactor.

In this invention it is described a process explained by following examples.

EXAMPLE 1

This experiment was done in a microwave heating system designed as a reactor (RF/MW reactor) of 1500 L capacity with five microwave magnetrons, wherein two of each 1 KW capacity and three of each 2 KW capacity were placed alternatively in the positions shown in FIG. 1. The booths of all the magnetrons were designed as shown in FIG. 3. The reactor was vacuum sealed and connected to a vacuum pump and maintained at a vacuum of around at least 375 mm of Hg before the magnetrons were switched on. 100 kg prawn shell was soaked in 100 L acetone. The substrate was soaked in acetone in the MW reactor with the features mentioned above. The soaking was first done for half an hour. The solvent with extracted water was drained out through a sieve in the bottom of the reactor and the substrate was once again soaked in acetone for half hour. The solvent and substrate was separated as above. This process was repeated once more. The reactor was then vacuum sealed and vacuumed to 375 mm of Hg. The magnetrons were switched on and the residue inside the MW reactor was subjected to solvent recovery. Heat generated by the interaction of MW systems and residual water evaporated acetone which was condensed and collected in the receiver. The resultant dehydrated prawn shell had a water content (analyzed as Loss on Drying at 100 degree C.) of 4%.

EG. 2

100 kg of turmeric extract with a residual solvent level of 750 ppm and moisture content of 2% was heated in the above MW heating system for 30 min as explained in eg. 1. The residual solvent after this process was found to be less than 300 ppm. The curcumin content of the extract was not reduced confirming the feasibility of the process.

EG. 3

100 Kg jack fruit peals were loaded into the reactor as described in eg. 1. 100 L of hexane was added and left for 30 min after which the solvent was drained out. A fresh batch of solvent was loaded and the process was repeated once again. The substrate now with residual moisture and solvent was then subjected to MW heating system as explained in Eg. 1. The solvent evaporated out was condensed and collected. The substrate (jack fruit peals) recorded a water content of 7%

EXAMPLE 4

This experiment was done in a microwave heating system designed as a reactor (RF/MW reactor) of 1500 L capacity with 5 microwave magnetrons, 2 each of 1 KW capacity and 3 each of 2 KW capacity were placed alternatively in the positions shown in FIG. 2. The booths of all the magnetrons were designed as shown in FIG. 3. The reactor was vacuum sealed and connected to a vacuum pump and maintained at a vacuum of around 375 mm of Hg before the magnetrons were switched on. 100 kg prawn shell was soaked in 100 L acetone. The substrate was soaked in acetone in the MW reactor with the features mentioned above. The soaking was first done for half an hour. The solvent with extracted water was drained out through a sieve in the bottom of the reactor and the substrate was once again soaked in acetone for half hour. The solvent and substrate was separated as above. This process was repeated once more. The reactor was then vacuum sealed and vacuumed to around 375 mm of Hg. The magnetrons were switched on and the residue inside the MW reactor was subjected to solvent recovery. Heat generated by the interaction of MW systems and residual water evaporated acetone which was condensed and collected in the receiver. The resultant dehydrated prawn shell had a water content (analyzed as loss on drying at 100 degree C.) of 4%.

EG. 5

100 kg of turmeric extract which was having a residual solvent level of 750 ppm and moisture content of 2% was heated in the MW heating system as explained in eg. 4 for 30 min. The residual solvent after this process was found to be less than 300 ppm. The curcumin content of the extract was not reduced confirming the feasibility of the process.

EG. 6

100 Kg jack fruit peals were loaded into the reactor as described in eg. 3. 100 L of hexane was added and left for 30 min after which the solvent was drained out. A fresh batch of solvent was loaded and the process was repeated once again. The substrate now with residual moisture and solvent was then subjected to MW heating system as explained in Eg. 3. The solvent evaporated out was condensed and collected. The substrate (jack fruit peals) recorded a water content of 7%.

INDUSTRIAL APPLICABILITY AND ADVANTAGES OF THE PROPOSED TECHNOLOGY

Patent-Application-IN 2659/CHE/2014 dated 30 May 2014, titled "Novel design of multiple Microwave/Radiofrequency (MW/RF) magnetrons heated single vessel/reactor/chamber and its various applications including a novel dehydration process employing solvent extraction and solvent recovery."

The major advantages and the industrial applicability of the proposed technology can be understood from the detailed discussion given below:
1. Scalable MW Reactor: This invention describes large microwave/radiofrequency (RF/MW) heating equipments scalable to any size, heated with RF/MW heating systems employing multiple magnetrons. Due to the development of this technology, existing MW heating vessels/reactors limited to around 100-200 litres capacity can be scaled up to tens of thousands of litres. Thus big heating reactors currently being operated with steam/hot oils/heating coils can be converted into MW based heating systems. It is very well known that MW heating systems which heat up the matrix first are multi-fold more efficient than conventional methods which heat the vessels first and heat the matrix later by conduction/convection.
2. Conventional heating systems based on steam/hot air/heating coil generates concentrated heat resulting in charring of the matrix. In the case of microwave heating systems with single magnetron, requirement of huge turn tables and high load of power are limitations and challenges in industrial large scale set up. The present invention, by using multiple magnetrons, provide uniform heating of the matrix/substrate (that too without the use of turn tables).
3. Another advantage of this invention is that while in conventional MW heating systems, where high capacity magnetrons (of 10, 20 KW etc) are used, the cost of magnetrons and accessories (such as huge transformers), is almost 10-20 times costlier than when multiple magnetrons of lower capacity like 1 KW or 2 KW are added up to provide the same cumulative power.
4. The use of low power magnetrons integrated to provide cumulative high capacity, opens up to the possibility of employing solar power source which again will work out cheaper when compared to the use of solar power for high capacity magnetrons (which need very high starting current).
5. Due to the above reasons conventional heating systems powered by electricity, boiler, hot oil etc can be easily substituted by our multiple magnetron MW/RF technology like alcohol/petroleum distillation industries, chemical industries, herbal extract industries, diary units etc
6. As an embodiment of our invention, we present solvent extraction—MW/RF dehydration technology by which products such as vegetables, fish, fruits, meat, chemicals etc can be dehydrated using an appropriate solvent and the residual solvent in the matrix is purged out using MW/RF heating system. This technology of dehydration can revolutionize the food industry wherein dehydrated food products are similar to that generated out of freeze drier with significant shelf life at ambient temperatures.
7. By virtue of the low equipment and operating cost, the dehydrated products will become more affordable to export markets which will not only enhance the dehydrated products market but also help farmers to process their produce before it perishes. Government agencies in the countries world over will be interested to procure the technology and transfer to the farmer groups.
8. Dehydrated products will considerably reduce the cost of transport. (The current cost of freight of one container load, around 18 MT, deep frozen marine product to Europe (from India) is around 3 Lakhs. This can be reduced to ⅓rd by using dehydrated products).
9. The dehydration process can be manoeuvred to generate fat-free, pesticide-free and antibiotic-free food products.
10. On an overall consideration, this novel technology can be an excellent economy model with varied applications in the areas of Food Dehydration/industry, distillation (alcohol/petroleum), process industry, extraction units etc.

We claim:
1. A microwave (MW) radiofrequency (RF) heating system of predetermined size and volume comprising:
a reactor;
a reactor cavity;
multiple magnetrons opening into a reactor cavity arranged in a spiral format to prevent interference of waves generated by the magnetrons, enabling wave outputs of the multiple magnetrons independent of each other when the magnetrons are turned on; and
a magnetron booth comprising a deflector in the middle of the magnetron booth, wherein the waves generated are scattered by the deflector in the path of the waves and angled wall before entering the reactor cavity;
wherein the multiple magnetrons are mounted on a central rotating shaft of the reactor and face walls of the reactor.

2. The MW/RF heating system of claim 1, wherein multiple magnetrons are of low capacity of about 1-5 KW.

3. The MW/RF heating system of claim 1, wherein multiple magnetrons are of about 1-2 KW.

\* \* \* \* \*